United States Patent
Specht et al.

(10) Patent No.: US 6,629,702 B2
(45) Date of Patent: Oct. 7, 2003

(54) DEVICE FOR INFLATING AN AIRBAG

(75) Inventors: Martin Specht, Feldafing (DE); Rudolf Meyer, Odelzhausen (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 146 days.

(21) Appl. No.: 09/982,408

(22) Filed: Oct. 18, 2001

(65) Prior Publication Data

US 2002/0130499 A1 Sep. 19, 2002

(30) Foreign Application Priority Data

Mar. 15, 2001 (DE) .......................... 101 12 558

(51) Int. Cl.[7] .............................................. B60R 21/26
(52) U.S. Cl. ........................................ 280/737; 280/740
(58) Field of Search ................. 280/736, 737, 280/740

(56) References Cited

U.S. PATENT DOCUMENTS

| | | | |
|---|---|---|---|
| 4,268,065 A | 5/1981 | Granig ........................ 280/737 |
| 5,344,186 A * | 9/1994 | Bergerson et al. .......... 280/741 |
| 5,516,144 A * | 5/1996 | Headley et al. .......... 280/730.2 |
| 5,529,333 A * | 6/1996 | Rizzi et al. ................. 280/737 |
| 5,582,426 A | 12/1996 | O'Loughlin et al. ........ 280/741 |
| 5,590,906 A * | 1/1997 | Faigle et al. ................ 280/741 |
| 5,593,180 A * | 1/1997 | Cuevas et al. .............. 280/741 |
| 5,620,204 A * | 4/1997 | Frey .......................... 280/737 |
| 5,664,804 A * | 9/1997 | Saccone ..................... 280/737 |
| 5,711,547 A * | 1/1998 | Blumenthal et al. ........ 280/737 |
| 5,820,162 A * | 10/1998 | Fink .......................... 280/742 |
| 5,854,441 A * | 12/1998 | Metzger ..................... 102/531 |
| 5,882,036 A * | 3/1999 | Moore et al. ............... 280/736 |
| 6,010,153 A * | 1/2000 | Halas et al. ................ 280/737 |
| 6,068,293 A * | 5/2000 | Shirk et al. ................ 280/737 |
| 6,206,412 B1 * | 3/2001 | Swann et al. ............. 280/730.2 |
| 6,227,562 B1 * | 5/2001 | Shirk et al. .............. 280/730.2 |
| 6,237,940 B1 * | 5/2001 | Shirk et al. .............. 280/730.2 |
| 6,244,622 B1 * | 6/2001 | Al-Amin et al. ............ 280/737 |
| 6,247,725 B1 * | 6/2001 | Moller ....................... 280/737 |

FOREIGN PATENT DOCUMENTS

| | | |
|---|---|---|
| DE | 2828371 | 1/1979 |
| DE | 19644258 | 4/1997 |
| DE | 19629339 | 1/1998 |
| DE | 19631006 | 2/1998 |
| DE | 19708980 | 3/1998 |
| DE | 10031865 | 1/2002 |

* cited by examiner

*Primary Examiner*—Paul N. Dickson
*Assistant Examiner*—Toan To
(74) *Attorney, Agent, or Firm*—Lonnie Drayer

(57) ABSTRACT

A device for inflating an airbag comprising a container for a compressed gas of a sealing device, which closes the container during normal operation and is provided in a gas release nozzle connected to the container in a gas tight manner, and a throttle opening, via which the released gas flows in a throttled manner out of the container via an emission opening and the gas release nozzle, whereby the throttle opening is formed through reshaping of a container wall part.

6 Claims, 3 Drawing Sheets

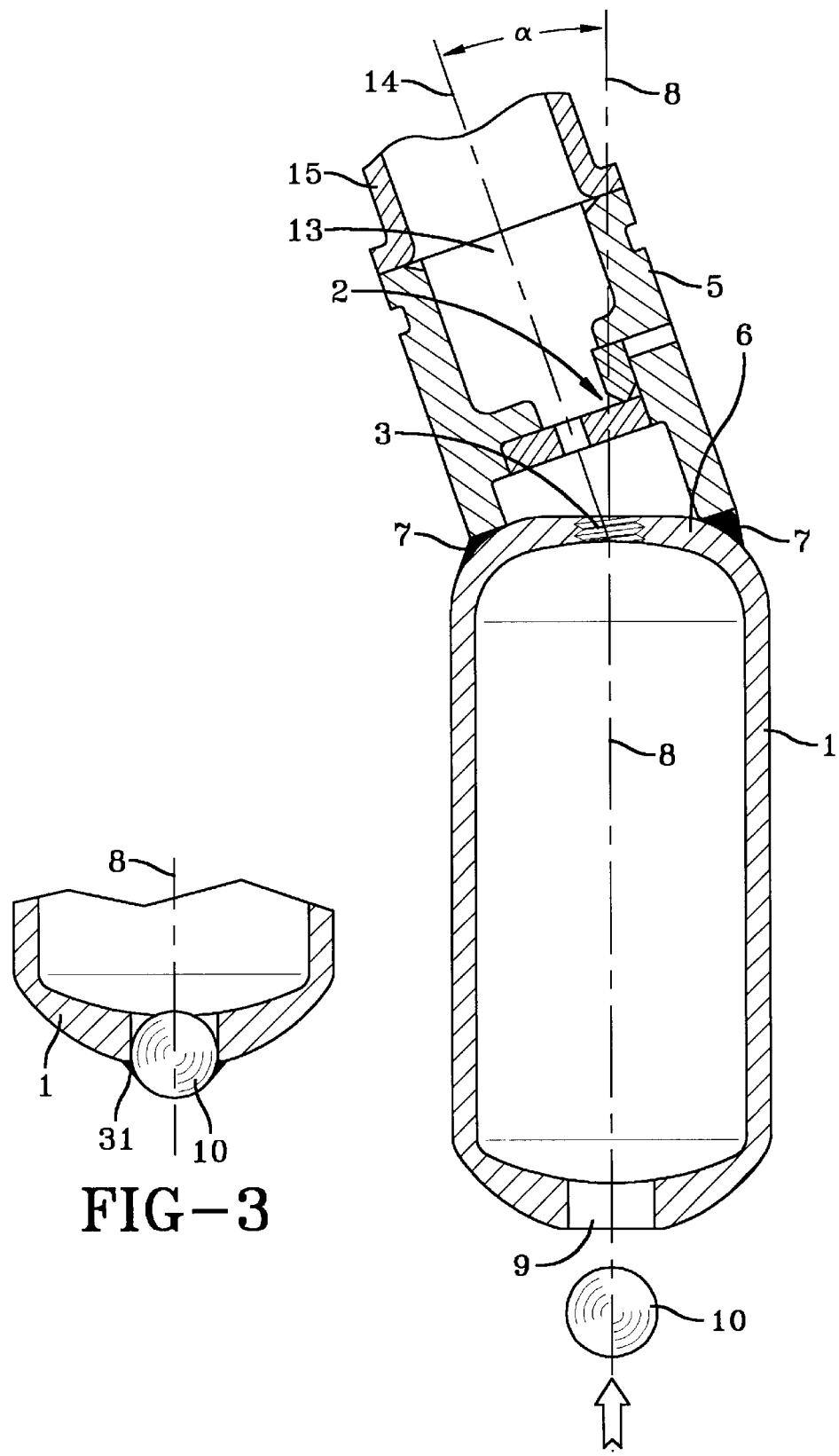

DEVICE FOR INFLATING AN AIRBAG

FIELD OF THE INVENTION

The present invention relates to a device for inflating an airbag.

DISCUSSION OF THE PRIOR ART

U.S. Pat. No. 6,247,725 B1 teaches a device for inflating an airbag that comprises a metal container containing a compressed gas, in particular an inert gas such as helium. A sealing device closes the container during normal operation and is opened to inflate of an airbag with the released compressed gas. A throttle opening for the compressed gas is located in the container. The throttle opening throttles the rate at which the gas exits from the opened container. In the known device, the throttle opening is provided in a throttle plate, which is inserted into the inside of the container in the emission direction in front of the emission opening of the container in a gas tight manner by welding. The gas outlet opening is located at the end of a bottleneck of the container and during normal operation is closed by a foil-shaped sealing element welded to the bottleneck in a gas tight manner. For the mechanical support of the sealing element, in the emission opening a support plate is provided, which is supported via a pressure piece on a gas release nozzle that is welded to the bottleneck of the pressure container in a gas tight manner. The pressure piece is removed by a pyrotechnic device to open the emission opening. Such a sealing device is also taught by DE 195 40 618 A1.

SUMMARY OF THE INVENTION

There is provided in accordance with the present invention a device for inflating an airbag comprising a container for a compressed gas and a sealing device that closes the container during normal operation and is opened to release gas to inflate the airbag, a gas throttle is located in a wall of the container, a gas release nozzle is attached to the container arranged around the throttle opening with a gas release opening is provided in the gas release nozzle.

BRIEF DESCRIPTION OF THE DRAWINGS

FIG. 2 is a sectional view of a second embodiment.

FIG. 3 is a fragmentary cross section view of a container end after the filling of a compressed gas container.

DETAILED DESCRIPTION OF THE INVENTION

Figure 1:
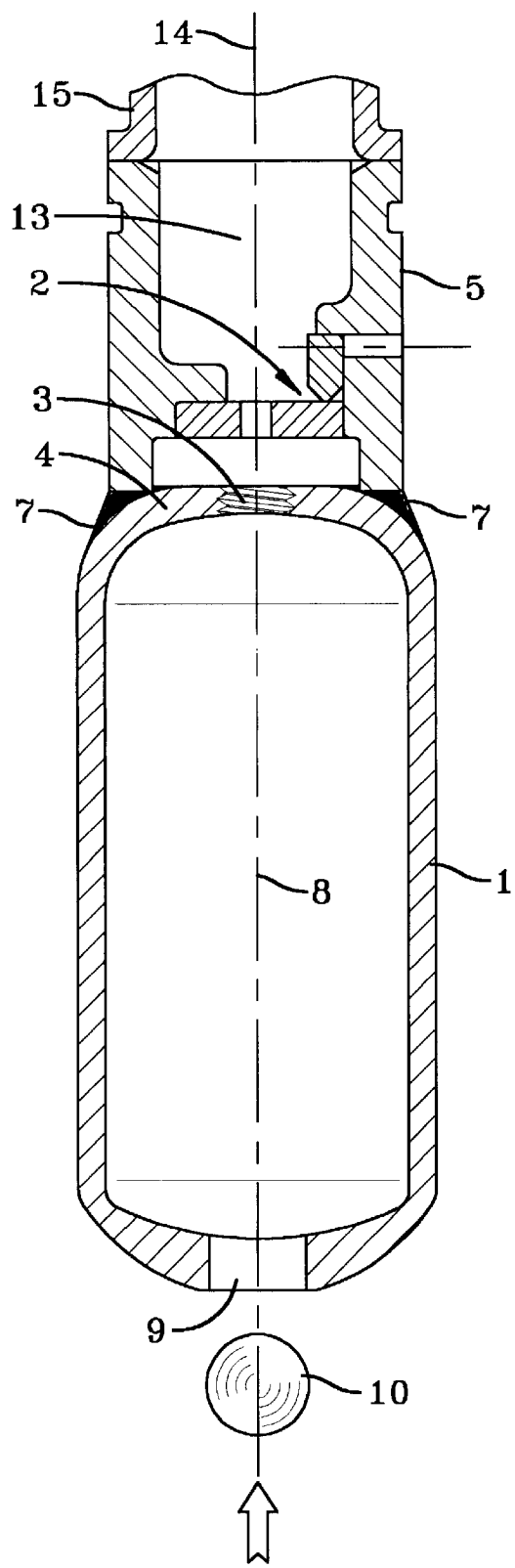
FIG. 1 is a sectional view of a first embodiment.

The drawings show embodiments of a device for inflating an airbag wherein the device comprises a metal container 1, in particular steel, in which a compressed gas is held in readiness. The container is filled with the compressed gas, in particular an inert gas such as helium, via an container filling opening 9 that is located opposite the throttle opening 3 in the container wall. A gas release nozzle 5 is connected to the container 1 in a gas tight manner by a gas tight joint 7 that surrounds a throttle opening 3 through the container wall. The gas tight joint 7 preferably comprises a welded seam, most preferably a plasma welded seam. The throttle opening 3 is formed through reshaping of the container, in particular reshaping under pressure, such as forging of an end of the cylindrical shaped metal container 1. A corresponding wall part 4 of the container 1 can be curved inwards towards the axis 8 of the container, such that a level or slightly curved outer surface occurs at the wall surface, in which the throttle opening 3 is arranged as shown in FIG. 1. It is also possible, however, during the reshaping to form a dome-shaped wall part 6, as shown in FIG. 2, in which the throttle opening 3 is provided. A refinishing of the border surrounding the throttle opening 3 is not necessary.

During normal operation, the throttle opening 3 s closed towards the outside in a gas tight manner in front of an area defined by the gas release nozzle 5 and the sealing device 2 at the surface wall of the preferably cylindrical or bottle-shaped container. The gas release opening 9 closed by the sealing device is located in the gas release nozzle. The throttle opening can also be formed behind the gas release opening in the gas release nozzle, such as by a catch piece with several openings.

In the embodiment shown in FIG. 1, the gas release nozzle 5 is arranged with its longitudinal axis 14 essentially coaxial to the axis 8 of the throttle opening 3 and the container 1. In the embodiment shown in FIG. 2, the longitudinal axis 14 of the gas release nozzle 5 is displaced at an angle in relation to the axis 8. This angle can measure up to 25°. This enables the arrangement of the essentially cylindrical container 1 with relation to a tube or hose, with which the airbag is inflated with gas released from the container 1, to be easily installed. When the gas release nozzle is arranged obliquely to the axis 8 of the throttle opening or the cylindrical shaped container for reasons of installation in a motor vehicle, a simpler connection with the container wall is achieved. In particular when the front end of the gas release nozzle is connected to a tube end of the inflation tube, the advantage arises that the longitudinal axis of the gas release nozzle is essentially in alignment with the axis of the tube end and in particular a joined-on part of the inflation tube. The angle assumed by the longitudinal axis of the gas release nozzle in relation to the axis of the in particular cylindrical-shaped container, can be selected depending on the type of vehicle, in which the airbag is arranged. The embodiment shown in FIG. 2 is preferably employed for inflating an airbag acting as a side crash protection in a motor vehicle. To this effect, the embodiment shown in FIG. 2 is arranged in the region of the C-pillar of the motor vehicle. Via a tube end 15, the inflation device is connected to a not further represented inflation tube or inflation hose, which extends essentially along the lateral roof bar of the motor vehicle. An airbag device of this type is known from DE 197 38 741 A1, for instance. As shown in FIGS. 1 and 2, the tube end 15 is arranged essentially coaxially to the longitudinal axis 14 of the gas release nozzle 5, is connected to the latter in a gas tight manner. The gas tight connection is preferably achieved through welding to the end of the gas release nozzle 5.

The connection of the tube end 15 with the gas release nozzle 5 can for instance take place in the manner described in DE 100 31 865.

Figure 4:
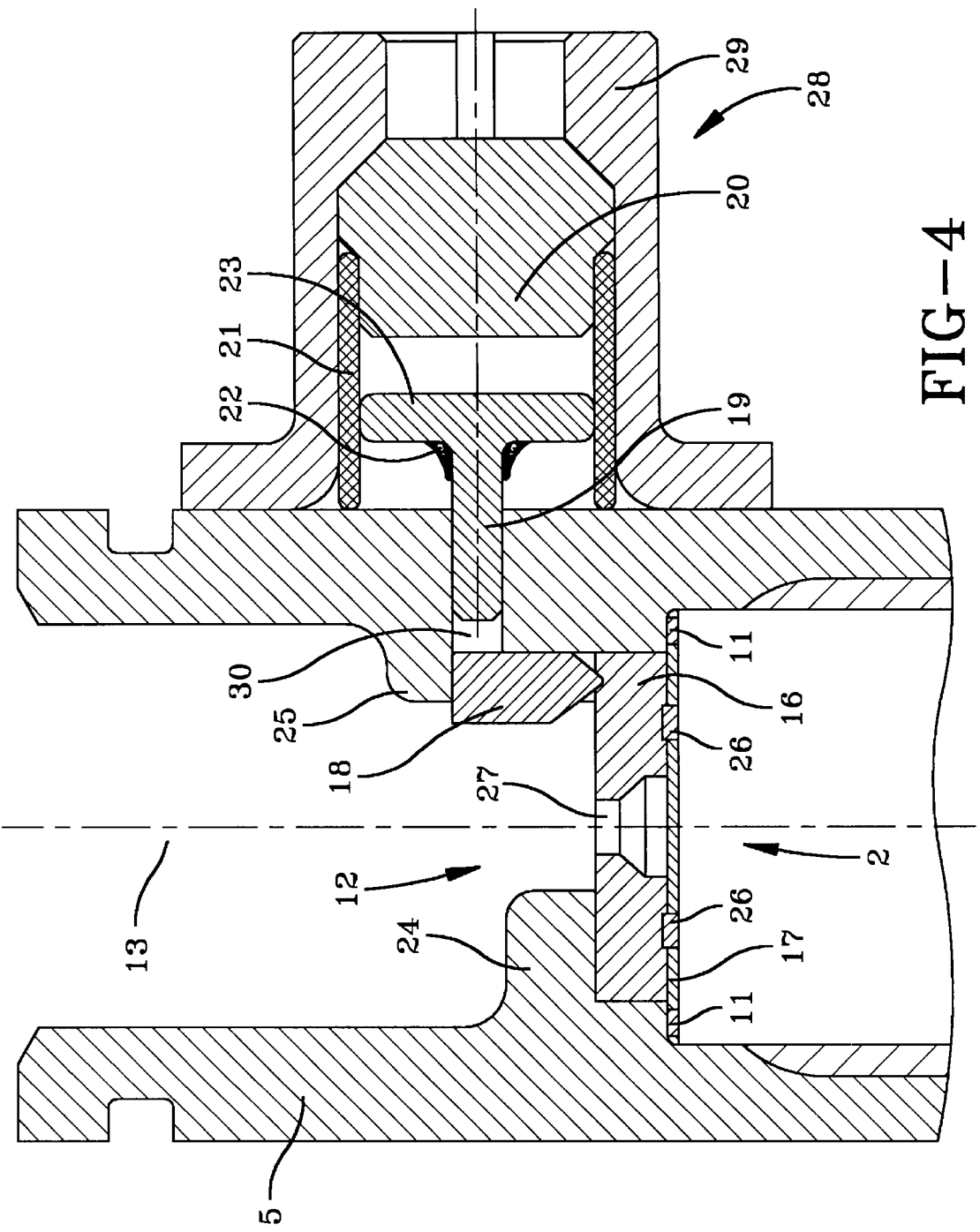
FIG. 4 is a sectional view of a gas release nozzle with a an integral sealing device and release device for the opening of the gas release opening that is located in the gas release nozzle.

FIG. 4 shows an embodiment for a gas release nozzle 5 that can be connected to the container 1 of the embodiments of FIGS. 1 and 2 in a gas tight manner, for instance by welding. This gas release nozzle 5 comprises a gas release opening 12 that is closed during normal operation by a sealing device 2. The sealing device 2 comprises a sealing foil 17 which, via a surrounding welding point 11, surrounding the gas release opening 12, is connected to the inner wall, preferably a surrounding supporting shoulder of the gas blow-of nozzle 5, in a gas tight manner. The sealing foil 17 preferably comprises a metal foil. The sealing device can be manufactured as a prefabricated component integral to the gas release nozzle before the latter's gas tight connection, for example before its welding to the container. The sealing foil 17 is supported via a support plate 16 to an abutment 24. The abutment 24 is provided on one side of the inner wall of the gas release nozzle 5 as a projection. Diametrically thereto a second abutment is positioned in the shape of a locking element 18, which is supported on an inwardly extending projection 25 at the inner side of the gas release nozzle 5. The sealing foil 17 can be connected to the support plate 16 in a gas tight manner by one or several welds 26, which preferably run in an annular manner around an opening 27 in the support plate 16 acting as an excess pressure safety device. The gas release nozzle 5 with the sealing device 2 can be a prefabricated component. This prefabricated component is connected to the container 1 via the already mentioned gas tight joint 7, preferably a welded seam. In the assembled state, as shown in FIGS. 1 and 2, the throttle opening 3 is located in the gas emission direction and is arranged in the reshaped wall part 4 or 6, in front of the gas release opening 12, closed during normal operation.

To open the gas release opening 12, a release device 28 is used, which can be arranged at the gas release nozzle 5 before or after the connection of the gas release nozzle 5 to the container 1. This release device 28 comprises a housing 29, which is fastened to the outer surface of the gas release nozzle 5 by a clamp or strap or the like that is not shown in the drawings. In the housing 29, a guide tube 21, in which a piston 23 is arranged, is located. A release tappet 19 is fastened to the piston 23 or arranged as one piece with the piston 23. The release tappet 19 projects through an essentially radially extending guide opening 30 that faces towards the locking element 18. The guide opening 30 extends through the wall of the gas release nozzle 5. In addition, a pyrotechnic propellant 20 is arranged in the housing 29 and can be electrically ignited in a known manner. During the ignition of the propellant 20, the piston 23 and the release tappet 19 are moved towards the locking element 18 in such a way that the latter is removed from the represented locking position. On the basis of the high pressure in the container 1 of the contained gas, the support plate 16 is pivoted around the abutment 24, whereby the sealing foil 17 is ripped open and the gas release opening 12 is opened.

At the transfer point between the piston 23 and the release tappet 19, a seal 22 is located. This seal can be made of the same material as the piston 23 and the tappet 19 and be arranged with the latter as one piece. By means of the ignited propellant 20, this sealing 22 is pressed into the guide opening 30, so that during the release or the discharge of the gas release opening 12 the end of the release tappet 19 sits in the guide opening 30 in a self-sealing manner with the conical shape of the sealing 22, as shown in FIG. 4. This way after the release process, the guide opening 30 is outwardly sealed. The gas in the container 1 flows through the gas release nozzle 5 into the inflation tube, which is connected by the tube end 15 to the gas release nozzle 5. Through the throttle opening 3 a throttled release of the compressed gas in the container 1 in the gas release nozzle is ensured.

The filling of the container 1 with the compressed gas takes place after the gas release nozzle 5 is connected to the gas release opening 12 closed by the locking device 2 in a gas tight manner, for instance through plasma welding with the container 1. To this effect a container filling opening 9 is located at the end of the cylindrical container 1 opposite the throttle opening 3. When the container 1 is filled with the required amount of compressed gas with for instance approximately 600 bar, a ball 10 is inserted into the container filling opening 9 and connected to the container 1 in a pressure-tight manner, preferably through plasma welding with an annular welded seam 31, as shown in FIG. 3.

The invention may be embodied in other specific forms without departing from the spirit or essential characteristics. The described embodiments are to be considered in all respects only illustrative and not restrictive. The scope of the invention is therefore indicated by the appended claims rather than the foregoing description. All changes that come within the meaning and range of equivalency of the claims are to be embraced within their scope.

We claim:

1. A device for inflating an airbag comprising a container for a compressed gas and a sealing device that closes the container during normal operation and is opened to release gas to inflate the airbag, a gas throttle is located in a wall of the container, a gas release nozzle provided with a gas release opening is attached to the container arranged around the throttle opening, the sealing device being integral to the gas release nozzle, and a release device fastened to the gas release nozzle for opening the sealing device by moving a release tappet equipped with a conical sealing ring through a guide opening of the gas release nozzle whereby the conical sealing ring of the release tappet seals the guide opening.

2. The device for inflating an airbag according to claim 1 wherein the sealing device is arranged in the gas release nozzle.

3. The device for inflating an airbag according to claim 1 wherein the gas release nozzle is attached to the container by a the gas tight joint.

4. The device for inflating an airbag according to claim 1 wherein the container wall part in which the throttle opening is located is dome-shaped.

5. The device for inflating an airbag according to claim 1 wherein a tube end of a tube used to inflate the airbag is connected to the gas release nozzle in a gas tight manner is aligned with a longitudinal axis of the gas release nozzle.

6. The device for inflating an airbag according to claim 1 wherein a longitudinal axis of the gas release nozzle runs obliquely to an axis of the throttle opening.

\* \* \* \* \*